Sept. 9, 1930.                H. D. BEARDSLEY                1,775,082
                         ADJUSTABLE AUTOMOBILE SEAT
                            Filed May 28, 1929
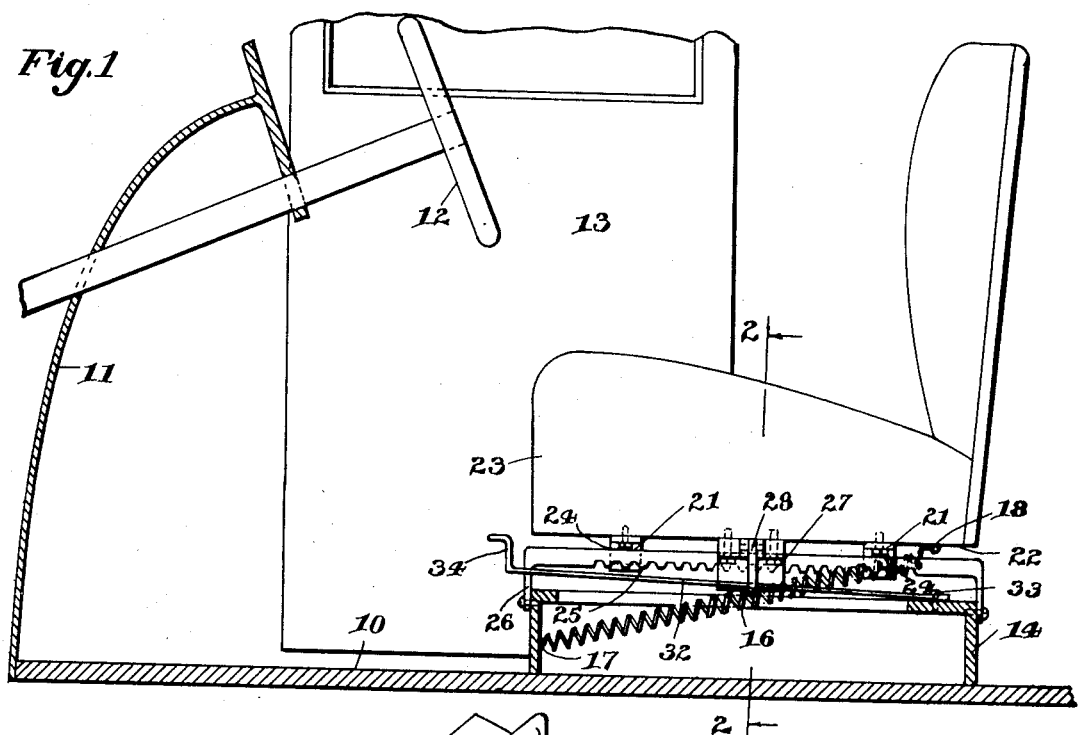
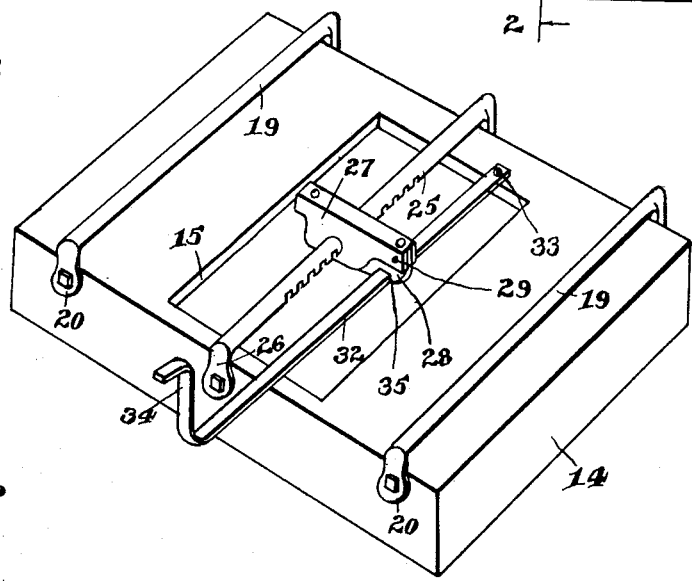
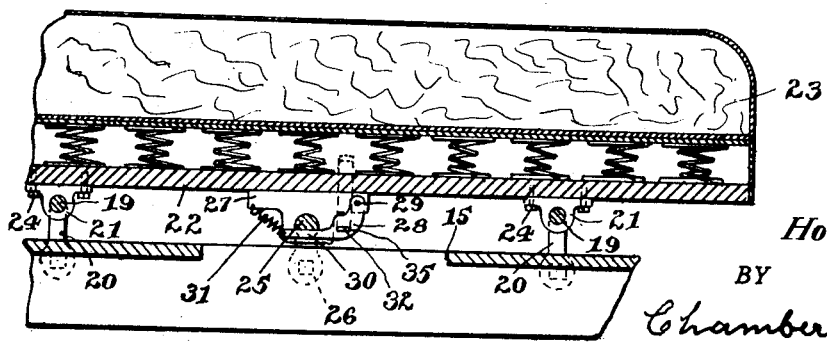
INVENTOR.
Howard D. Beardsley
BY
Chamberlain & Newman
ATTORNEYS.

Patented Sept. 9, 1930

1,775,082

UNITED STATES PATENT OFFICE

HOWARD D. BEARDSLEY, OF WOODBURY, CONNECTICUT

ADJUSTABLE AUTOMOBILE SEAT

Application filed May 28, 1929. Serial No. 366,612.

My invention relates to new and useful improvements in vehicle seats and more particularly to a front seat for an automobile, being especially applicable for use in closed vehicles and adapted to be readily adjusted to suit the driver and so as not to obstruct the entrance to the car.

An object of the invention is to provide a seat that is of simple and durable construction and adapted to be installed in various types of cars without materially altering their construction, and further to provide a seat of the class designated, whose operating means is conveniently positioned at the front of the seat, so that it may be conveniently and easily adjusted; further to employ spring means for normally holding the seat in a desired position and whereby it may be manually adjusted in an opposed direction against the action of said spring.

With these and other objects in view, the invention resides and consists in the construction and novel combination and arrangement of parts hereinafter more fully described, illustrated in the accompanying drawings and pointed out in the claims hereto appended, it being understood that various changes in the form, proportion, size, and minor details of construction within the scope of the claims may be resorted to without departure from the spirit, or sacrificing any of the advantages of the invention.

Similar characters of reference denote like or corresponding parts throughout the several figures of the accompanying drawing forming a part of this specification and upon which Fig. 1 shows in sectional elevation an adjustable automobile seat constructed in accordance with my invention, and as it would appear positioned in the forward portion of a closed car and adapted to be adjusted in either a forward or backward direction.

Fig. 2 is a sectional view on the line 2—2 of Fig. 1; and

Fig. 3 shows a perspective view of the base mounted upon the floor of a car and upon which the seat is adjustably positioned.

Referring more particularly to the drawings and characters of reference marked thereon, 10 indicates the floor of a car, 11 the cowl, 12 the steering wheel and 13 one of the front doors, all of which may be of the usual or any preferred construction, and as has been included in the illustration, better to indicate the relative position of my improved adjustable seat.

14 represents a base which may be formed integral with the floor 10 or made separate and secured thereto. The top of this base is preferably enclosed with the exception of a central opening 15 formed to accommodate the tension spring 16, one end of which is secured as at 17 to the inside of the base and the other end at 18 to the movable seat.

The guide rods 19—19 are of like construction and have depending end portions 20 that are secured to the base 14 so that their running portions are in equal spaced relation to the top of the base and in parallel relation to each other. These guide rods serve to accommodate bearings 21 that are slidably fitted to the rods and secured to the bottom 22 of the seat 23 by means of screws 24. These bearings, preferably two for each rod, are positioned thereon in a manner to allow the same and the seat to be freely slid forward and backward.

A rack member 25 which also had depending end portions 26 secured to the base and positioned intermediate of the two said guide rods 19 and in parallel relation thereto so as to accommodate a locking member 27 which is also secured to the underside 22 of the seat and slidably fitted upon the rack 25 so as to move backward and forward thereon similar to the bearing supports 21, when the seat is to be adjusted and when the said locking device is disengaged from the rack teeth. This locking device further includes a pawl 28 pivoted to the body 27 as at 29 and having a spring actuated end portion 30 that is disposed crosswise of the member 25 and in position to engage the teeth on the underside of the rack through the action of its spring 31 when not otherwise supported. This engagement obviously serves to hold the seat in position against the action of the spring 16 until the pawl is released for different adjustment.

This pawl is designed to be manually operated against the action of the spring 31 through the medium of a lever 32, one end of which is secured as at 33 to the top of the base and whose other end includes a handle portion 34 for operation. This lever extends through a slot 35 in the pawl in distant relation to its pivot so that by a downward pressure upon the handle and lever the pawl may be disengaged from the rack against the action of the spring 31 to permit forward and backward adjustment of the seat.

Having thus described my invention, what I claim and desire to secure by Letters Patent is:

1. In an adjustable vehicle seat a base, guide rods carried thereon, a seat having bearings to engage the guide rods to permit of forward and backward adjustment of the seat, a rack member also supported upon the base, a locking device carried by the seat and in slidable engagement with the rack, said locking device including a spring actuated pawl pivotally mounted therein, a lever in slidable engagement with the pawl having one end attached to the base and the other end disposed for manual operation for the disengagement of the pawl from the rack to permit adjustment of the seat.

2. In combination, a seat member, a base member, slidable bearings on one of said members, a fixed rod on the other of said members for engagement of the bearings, a locking device carried by one of the members, a rack for engagement of the locking device, a spring means normally urging the seat in one direction, said locking device and rack cooperating to maintain the seat in an adjusted position against the action of said spring, and a lever in slidable engagement with the lock and pivotally secured to one of said members, one end of said lever being disposed for manual operation for unlocking the locking means to permit adjustment of the seat.

Signed at Woodbury, in the county of Litchfield and State of Connecticut this 25th day of May A. D. 1929.

HOWARD D. BEARDSLEY.